May 31, 1932.   T. S. BINDSCHEDLER   1,860,728
UNIVERSAL MOTOR
Original Filed Oct. 6, 1925   6 Sheets-Sheet 1

Inventor:
Theodore S. Bindschedler
By Rector, Hibben, Davis and Macauley
Attys.

May 31, 1932.  T. S. BINDSCHEDLER  1,860,728
UNIVERSAL MOTOR
Original Filed Oct. 6, 1925  6 Sheets-Sheet 2

Inventor:
Theodore S. Bindschedler
By Rector, Hibben, Davis and Macauley
Attys.

May 31, 1932.　　T. S. BINDSCHEDLER　　1,860,728
UNIVERSAL MOTOR
Original Filed Oct. 6, 1925　　6 Sheets-Sheet 3

May 31, 1932.  T. S. BINDSCHEDLER  1,860,728
UNIVERSAL MOTOR
Original Filed Oct. 6, 1925   6 Sheets-Sheet 4

Inventor:
Theodore S. Bindschedler
By Rector, Hibben, Davis and Macauley
Attys.

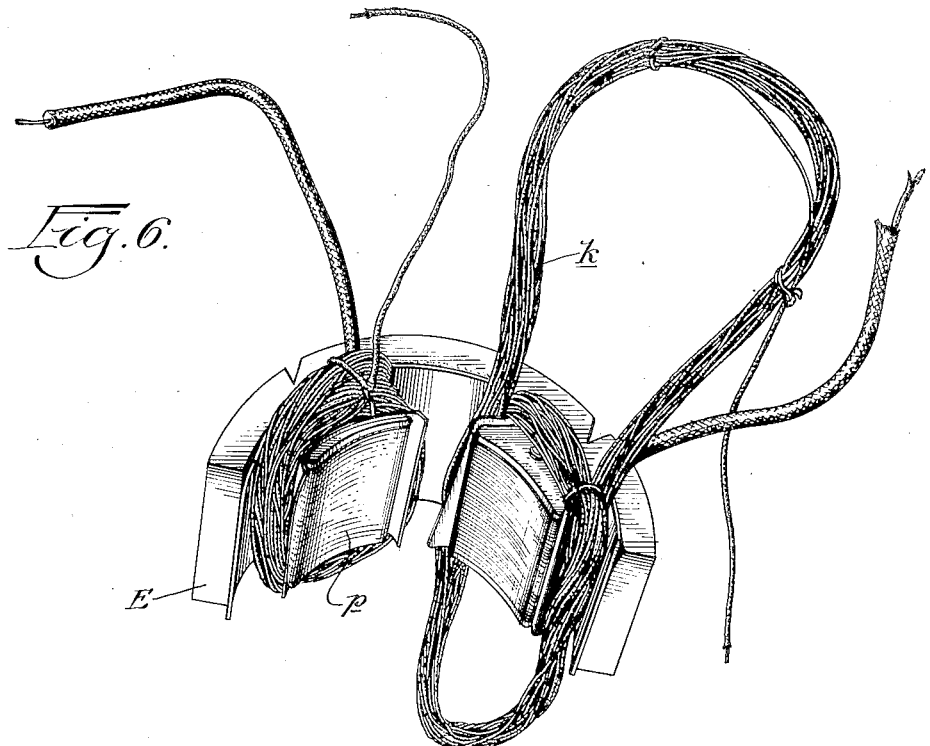
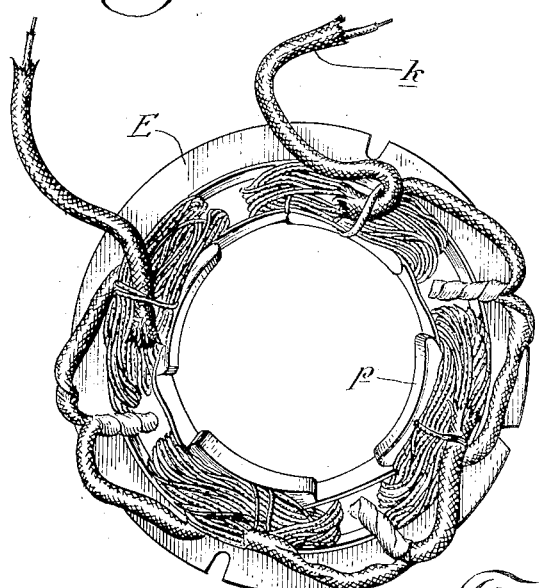

Patented May 31, 1932

1,860,728

UNITED STATES PATENT OFFICE

THEODORE S. BINDSCHEDLER, OF DETROIT, MICHIGAN, ASSIGNOR TO BURROUGHS ADDING MACHINE COMPANY, OF DETROIT, MICHIGAN, A CORPORATION OF MICHIGAN

UNIVERSAL MOTOR

Application filed October 6, 1925, Serial No. 60,761. Renewed January 18, 1932.

This invention relates to electric motors of the type known as universal motors because of their adaptability for use on either direct current or alternating current circuits.

It relates particularly to small motors for use in driving accounting machines, domestic appliances, fans and similar devices. Although it finds its principal application to such motors, and especially to motors for driving accounting machines, it may also be used with larger motors, if desired.

Small motors are generally applied to devices used by persons wholly unfamiliar with electricity and such users want a motor that will operate when connected to any ordinary socket regardless of whether the current is direct or alternating. A direct current motor will not operate satisfactorily on alternating current. Sparking often occurs at the brushes and if it is shunt or compound wound, it has a winding containing many turns of fine wire which will invariably burn out under excessive load, too great a voltage fluctuation, or when the motor is connected to alternating current. A direct current shunt or compound wound motor is consequently not suitable. On the other hand, an alternating current induction motor usually has a starting winding with many turns of fine wire and this can easily be burnt out when the motor is connected to a direct current circuit. To meet these conditions a series-wound, commutator type of motor suitable for both alternating and direct current has been employed. It develops a high starting torque with a small current and has no windings that can be easily burnt out by connecting it to the wrong current.

One of the difficulties with the usual series-wound commutator motor is that the torque is generally several times greater with direct current than with alternating current. This makes the motor unsuitable for many uses, as for example, where the same starting and running torque are wanted regardless of the kind of current used. The difference in the torque developed is largely due to the fact that, when the motor is operating on direct current, the flow of current through the armature is opposed only by the resistance of the winding and the counter-electromotive force of the armature, whereas, when the motor is operating on alternating current, the flow of current is opposed not only by the resistance of the windings and the counter-electromotive force of the armature, but also by the inductive effect of the armature, or its reactance. This greatly reduces the amount of current that will flow and since the torque is a function of the amount of current flowing, the torque is reduced. In addition, the inductive effect of the armature results in a low power factor which further decreases the torque and causes poor commutation. As a result, a motor designed for proper operation on direct current will give only a fraction of the desired torque when connected to an alternating current circuit.

Various expedients have been proposed for compensating the inductive effect of armatures, the most of these being suitable only for large railway motors. These expedients include the use of compensating windings outside the armature, generally associated with the field; the use of compensating or interpoles, and the use of a second or special winding on the armature.

The difficulty with compensating windings is, in addition to their expense and complication, that the field must be of the alternating current type of construction, that is, the stator must be a cylindrical one having slots equally spaced all around it. The field windings are placed in these slots so as to distribute the poles around the stator and the compensating winding is then located around the inner periphery of the field and inside of the regular field winding. This crowds the field coil space, obstructs ventilation, renders repair of field coils difficult, is expensive, and requires that the motor be larger and heavier than it otherwise would be. The size of the motor is an especially important factor as the motors must be of minimum size and weight. For example, motors used to drive accounting machines, vacuum cleaners, drink mixers, etc., can occupy only a limited space, and they must be very light in order not to increase the weight of the appliance with which they are used. The alternating current type of motor made larger and heavier to accommodate compensating windings will not do.

Another difficulty with the alternating current type of motor with compensating windings is that a very small air gap must be employed in order to get the benefit of the compensating windings. This means that as soon as the armature bearings wear a little, the armature begins to strike the stator and the motor is soon out of order.

Another highly desirable characteristic of small motors is that they be noiseless. Most of them hum loudly when used on alternating current. There is a very decided tendency for an alternating current type of motor to be noisy owing to the large number of teeth in the stator and the small air gap employed. The teeth of the armature passing the teeth of the stator cause a sudden change in the reluctance of the circuit which sets up a vibration and hum.

Interpoles may be used for compensating the inductive effect of the armatures of large motors but they are not practical with small motors. The expense and complication with small motors becomes prohibitive and, in addition, the leakage between the interpoles and the main poles is so great that the effect of the interpoles is destroyed. In order to make a small motor of this type operable from a practical standpoint, it would have to be made much larger than is permissible in the type of small motors in question.

Separate and special compensating windings on the armature require a larger armature and therefore increase the size of the motor. These windings also increase the expense and the liability of general trouble.

Combined with these obstacles to the production of a small motor that will operate as efficiently on alternating as on direct current is the fact that any construction of value must be capable of being easily and inexpensively produced under commercial conditions. It must be fool-proof and sturdy and its cost must not be high. The present invention has been devised with these ends in view.

The general object of the invention is to provide an improved means for compensating the inductive effect of the armature of a series-wound commutator type of alternating current motor.

A more particular object is to do this in such a way that the motor will develop substantially the same starting and running torque on both alternating and direct current.

A further object is to provide a means for compensating which will enable constructions to be used that reduce the size and the cost of the motor and at the same time decrease the effect to be compensated.

Other objects and advantages of the invention will hereinafter appear.

The invention comprehends the use of a single armature winding in which the conductors are positioned so that some of them neutralize the magnetic effect of others to thus compensate the inductive effect or reduce the reactness to permit a larger alternating current to flow and to improve the power factor. More specifically, the winding is positioned so that some of the conductors in which current is flowing in one direction are positioned in the same slot with conductors in which the current is flowing in the opposite direction so that the conductors neutralize one another magnetically.

An embodiment of the invention is illustrated in the accompanying drawings in which:

Fig. 6 shows a perspective view of a part of the stator of the motor illustrated in Figs. 4 and 5, showing a partial application of one of the pole pieces of the preferred skein winding.

Fig. 7 shows an end elevation of the magnetic field of the stator after the skein windings have been applied to the pole pieces.

Figure 1:
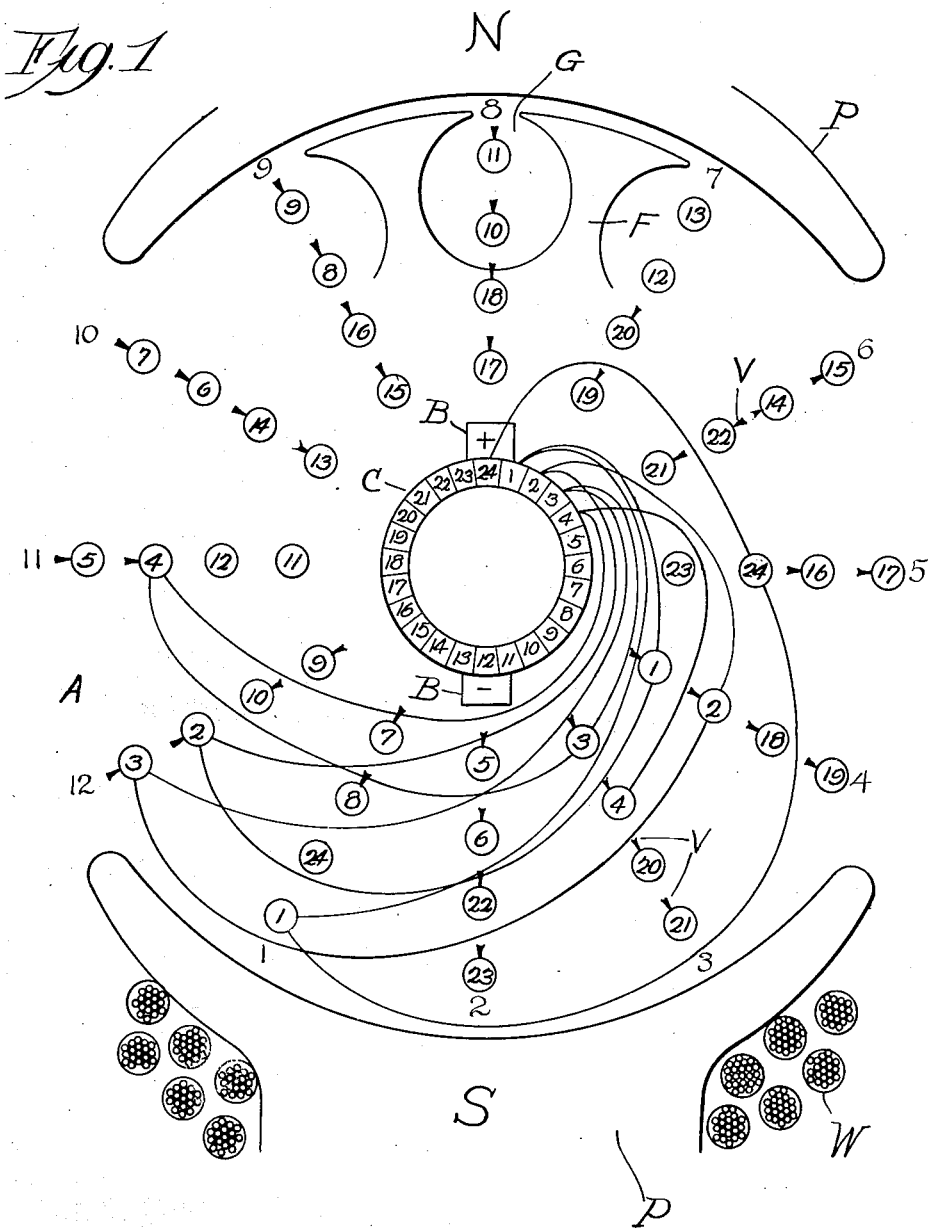
Figure 1 shows a somewhat diagrammatic end elevation of a portion of a two pole electric motor provided with a lap winding on its armature and embodying the features of the present invention.
Figure 2:
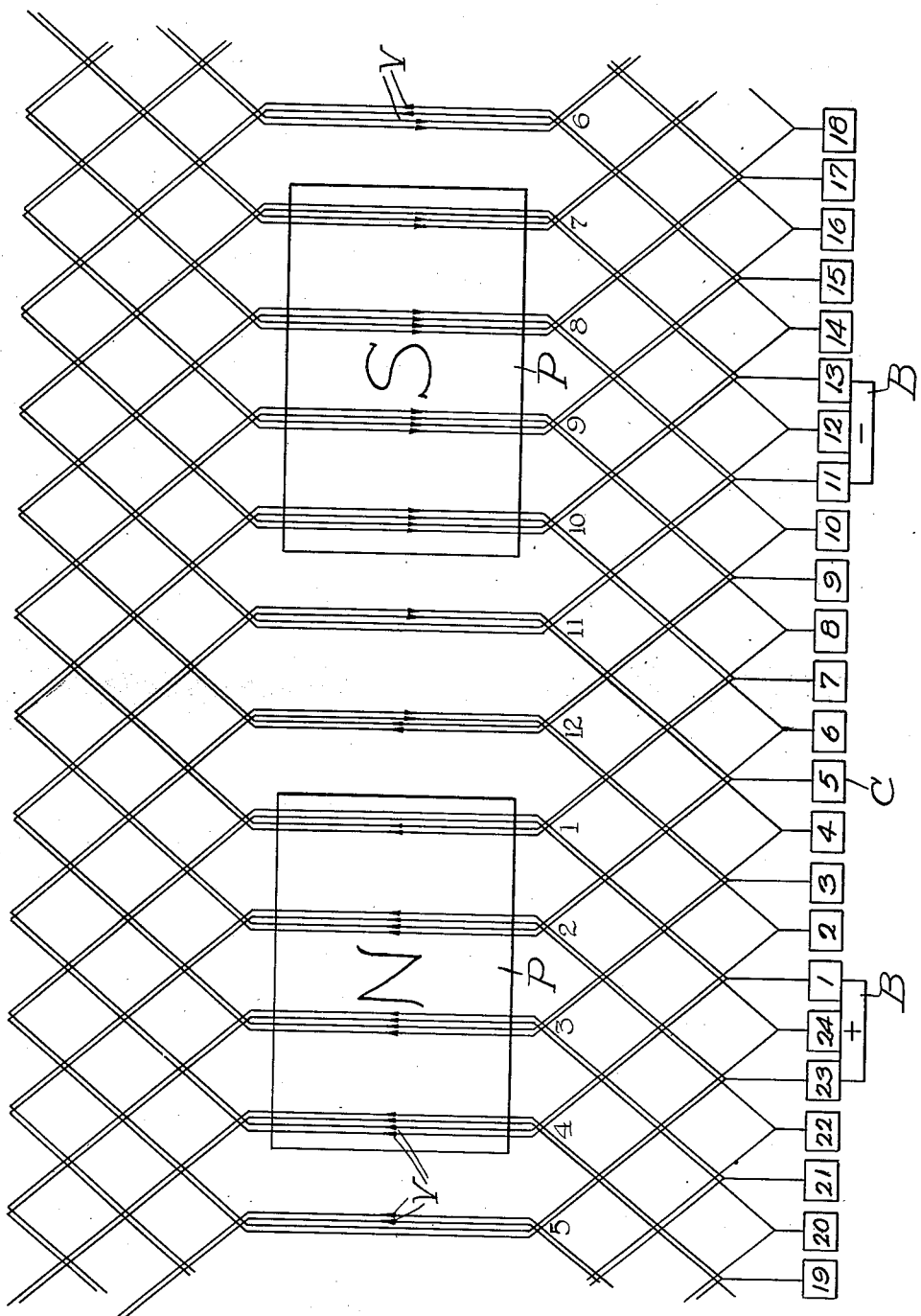
Fig. 2 shows a development of the lap winding illustrated in Fig. 1.

In Figs. 1 and 2 of the drawings, there is illustrated the embodiment of the invention in a two pole series motor provided with two pole pieces upon which the field windings are concentrated and having an armature winding of lap form. The pole pieces P have field windings W wound thereon, preferably in the form of loose windings provided by twisting loose skeins of wire around the pole pieces in the manner hereinafter described in connection with Figs. 6 and 7 and the second embodiment of the invention. Although the loose skein winding is preferably used on the pole pieces, the ordinary pre-formed tightly wound field coils may be employed in combination with the improved armature winding hereinafter described. The advantage of the loose skein windings is that they decrease the reactance of the circuit. The greater distance between the wires of the field winding in a loose coil decreases their mutual induction and thereby decreases the reactance of the field circuit. Since the field windings are connected in series with the armature winding, this tends to decrease the reactance of the armature circuit. The poles P, the polarity of which, at a given instant, is indicated by the letters N and S, are located on opposite sides of the rotor or armature A which comprises a magnetizable core or field F provided with a plurality of armature slots G, each slot being adapted to receive a plurality of armature conductors. The magnetic field of the stator including the pole pieces P, and the magnetizable field F of the armature, are formed preferably of laminations which are secured together in any suitable manner, and the slots G in the armature are preferably inclined longitudinally of the armature with respect to planes containing the axis of rotation of the armature so that the magnetic lines of force are cut gradually by the conductors, thereby equalizing the torque of the motor and lessening the "hum". In the construction illustrated in Figs. 1 and 2, the armature winding comprises forty-eight conductors, forming twenty-four complete armature turns. There are four conductors located in each of the armature slots G and the ends of the armature turns or coils are connected to the upper bars of a commutator C which has twenty-four commutator bars engaged by the oppositely disposed brushes B, the polarity of which, at a given instant, is indicated by the plus and minus signs.

The reduction in the reactance of the armature winding, when operating on alternating current, or, as it may be otherwise expressed, the compensating of the inductive effect of the armature is effected by arranging the armature winding so that the action of the current in one-half of the conductors in one or more of the armature slots, in that section of the armature which is undergoing commutation, is opposed by the action of the current in some or all of the other conductors located in each of the said slots, so that the magnetic and inductive effects of the conductors located in the same slot neutralize each other in the region of commutation. This desirable location of the conductors is obtained by the use of a winding pitch, or slot pitch, which is from one-half to three-fourths of the angular distance between the axes of pole pieces of opposite polarity, being preferably approximately one-half of that distance. Expressed in terms of electrical degrees, it being understood that there are 180 electrical degrees between the axes of poles of opposite polarity, it may be stated that the pitch of the winding of the present invention varies between 90 electrical degrees and 135 electrical degrees, being preferably about 90 electrical degrees.

In conjunction with this improved winding, the parts of the motor are preferably so constructed that the winding pitch does not exceed the pole arc, that is, the chord of the armature pitch is preferably not greater than the linear distance between the tips of a single pole face.

By positioning the conductors on the armature so that some of them neutralize each other magnetically and thus compensate and reduce the inductive effect of the armature, a larger alternating current will flow than would otherwise be the case. Both the starting and running torque on alternating current will be increased accordingly. When the motor is used on direct current, the adjacent conductors will neutralize each other magnetically with the effect of decreasing the armature flux and decreasing the torque. This same effect is present with alternating current but the increase in alternating current through all the armature conductors has such a larger relative effect that the decrease in flux due to the neutralizing action of a portion of the conductors is greatly overbalanced and is negligible. The net result is that the torque on alternating current is increased and that on direct current decreased so that the two approach each other in value and are substantially equal. This result is secured without the use of any added special windings on either the field or armature and without the use of interpoles. The simplicity of construction lowers manufacturing costs and decreases the expense and complications in repair and, in addition, a large number of unexpected advantages flow from and combine with the advantages of the improved method of compensating armature induction.

By compensating the inductive effect of the armature in the armature itself, the necessity for using the alternating current type of stator is avoided and the direct current type of field construction with individual pole pieces can be employed. This simplifies construction and reduces cost. It also aids in reducing the reactance of the armature. The reactance of a coil increases with the amount of iron in the magnetic circuit. In the alternating current type of construction the armature is surrounded throughout its entire periphery by the circular stator. In the present motor there is a very considerable air space on the outside of the armature between the pole pieces so that the entire armature circuit is not iron. In other words, there is a reduction in the amount of iron in the armature circuit with a consequent reduction in reactance. This reduction in reactance is made possible by the fact that the compensating effect takes place in the armature itself, thus permitting the use of a construction that secures an added reduction in armature reactance.

The presence of separate pole pieces also permits the use of loose skein windings to further reduce the reactance of the circuit including the field and armature.

The individual pole piece construction eliminates teeth in the face of the pole pieces in contra distinction to the alternating current type of stator with teeth throughout its face. The pole pieces have smooth uninterrupted faces. This reduces noise or humming caused by armature teeth passing pole teeth. Also by reason of the fact that compensation takes place within the armature, it is not necessary to use sharp pole tips close to the armature. Instead, rounded and receding pole tips may be employed as shown in Fig. 1, which construction reduces noise and tendency to hum.

Also because the compensation takes place within the armature, a larger air gap may be employed. This reduces noise by reducing the suddenness of the changes in reluctance of the magnetic circuit of the armature as it revolves beneath the pole pieces and it prolongs the life of the motor by avoiding the possibility of slight wear in the bearings of the armature shaft allowing the armature to strike the stator.

This larger air gap also reduces the armature reaction over what it would be if it were necessary to use a small air gap as is the case where compensating windings are used outside the armature. This improves commutation under varying loads. Commutation is also improved by reason of the fact that the placing of the conductors to secure the neutralizing effect referred to, results in a winding of short pitch. The individual coils embrace less flux and there is less current to be broken in commutation. These shorter coils also reduce copper losses. They also have less inductive "kick" or reactance because they enclose less iron than if they were full pitch.

A multitude of advantages are thus secured by the use of the improved means for compensating the inductive effect of the armature, and they are made possible by the construction that can be adopted in connection with the improved armature winding. These results add to and act in combination with the compensating feature to make an efficient motor for use on both alternating and direct current.

While the above theory of the compensating action and advantages of the invention is considered accurate, it is to be understood that, on account of the complicated nature of the electrical and magnetic phenomena that take place in a motor under direct and alternating current, the invention is not to be limited by this explanation. It has been found that by taking an ordinary small series-wound commutator motor and by substituting for its armature an armature wound as herein described, the same motor will develop 50% more torque on alternating current and 25% less on direct current. This occurs without changing any other parts of the motor. Since such a motor usually develops about three times as much torque on direct current as on alternating current, the advantage of the new construction in making the torques approach one another is readily apparent. When the motor is entirely built as herein described the advantage is more marked. The present motor will also start with from one-half to one-sixth of the current required by other standard types of motors of the same size. Its power factor is from 70% on starting to 90% while running as compared with 45% to 60% in present day constructions.

In the illustration of the improved lap winding illustrated in Figs. 1 and 2 of the drawings, where the connections are diagrammatically illustrated, all of the connections of the winding have not been shown in Fig. 1, but the method of tracing through the connections around the armature will be apparent, particularly in view of Fig. 2 which shows a development of the complete winding. The forty-eight conductors of the armature winding, each of which may be made up of a plurality of separate strands or wires, have been numbered in two series of twenty-four each and the bars of the commutator C have been numbered consecutively from 1 to 24, those armature conductors which are connected to the same commutator bar bearing the same number as that commutator bar. One series of conductors includes the two innermost conductors in each of the armature slots G and the other series of conductors includes the two outer conductors in each of the armature slots, one of the inner conductors of each slot being connected at the back of the armature to one of the outer conductors in another slot to form one armature turn or coil. In the arrangement illustrated in Figs. 1 and 2, the armature pitch, or slot pitch, may be said to be "1 and 5", that is, the first and fifth armature slots contain conductors which are connected at the back of the armature to form one armature turn or coil. Thus, conductor number 1, at the right of Fig. 1, which is one of the innermost conductors in one of the slots, is connected at the back of the armature to conductor number 2 of the outer series, which is one of the outermost conductors in the fifth armature slot from that in which the said conductor number 1 is located. This conductor number 2 is connected at the front of the armature to commutator bar number 2, thus completing one armature coil having the commutator bars numbers 1 and 2 as its terminals. The commutator bar number 2 is in turn connected to conductor number 2, at the right of Fig. 1, located in the same armature slot as the aforesaid conductor number 1, and this conductor number 2 is connected at the back of the armature to conductor number 3 of the outer series, located in the fifth slot therefrom, that is, in the same slot with conductor number 2 of the outer series. This conductor number 3 of the outer series is connected at the front of the armature to commutator bar number 3 and this bar is connected also at the front of the armature to conductor number 3 of the next armature coil, this conductor being located in the next armature slot to that in which conductors numbers 1 and 2 of the inner series are located. This conductor number 3 of the inner series is connected at the back of the armature to conductor number 4 of the outer series of conductors, located in the fifth armature slot from that in which the inner conductor number 3 is located. In this way the connections of the armature conductors are established throughout the armature to form a winding similar to the ordinary lap winding, except that the pitch is less than that usually employed, being in this instance about two-thirds of the distance between the axes of poles of opposite polarity and less than 135 electrical degrees. The polarity of the pole pieces P, at a given instant, is indicated by the letters N and S, as previously indicated, and, assuming the instantaneous polarity of the brushes B to be as indicated by the plus and minus signs shown in Figs. 1 and 2, the direction of the currents flowing in the various conductors of the armature winding at that instant will be as indicated by the arrow heads V associated with the conductors. As viewed in Fig. 1, an arrow directed outwardly from the axis of the armature indicates that the current is flowing in the conductor away from the reader, while an arrow head directed inwardly toward the axis of the armature indicates that the current is flowing toward the reader. The effect of this arrangement of the armature winding in causing a partial or complete neutralization of the effects produced by the current flowing in the conductors located in one armature slot may be best understood by reference to Fig. 2 where it will be seen that the currents are flowing in the same direction in all of those conductors located in each of the armature slots positioned beneath the pole faces, while in those armature slots which are located in the region of commutation, the currents flowing in two of the conductors in each armature slot are opposed in direction to the currents flowing in one or more of the conductors located in the same armature slot. In two of the armature slots, the currents in two of the conductors are opposed by the currents in both of the other conductors in the same slot so that a complete neutralization is effected.

In two of the other adjacent armature slots, current flows in only two of the conductors, the other two having no current flowing in them at that instant. The reactance is less in these slots, though not completely neutralized. In the construction illustrated, there are only two slots in which neutralization occurs but this number may be increased by shortening the pitch of the winding and arranging the conductors accordingly. In this way, the inductive effect of the alternating current flowing in the armature winding is materially reduced and the undesirable effects of the armature reactance materially overcome.

Figure 3:
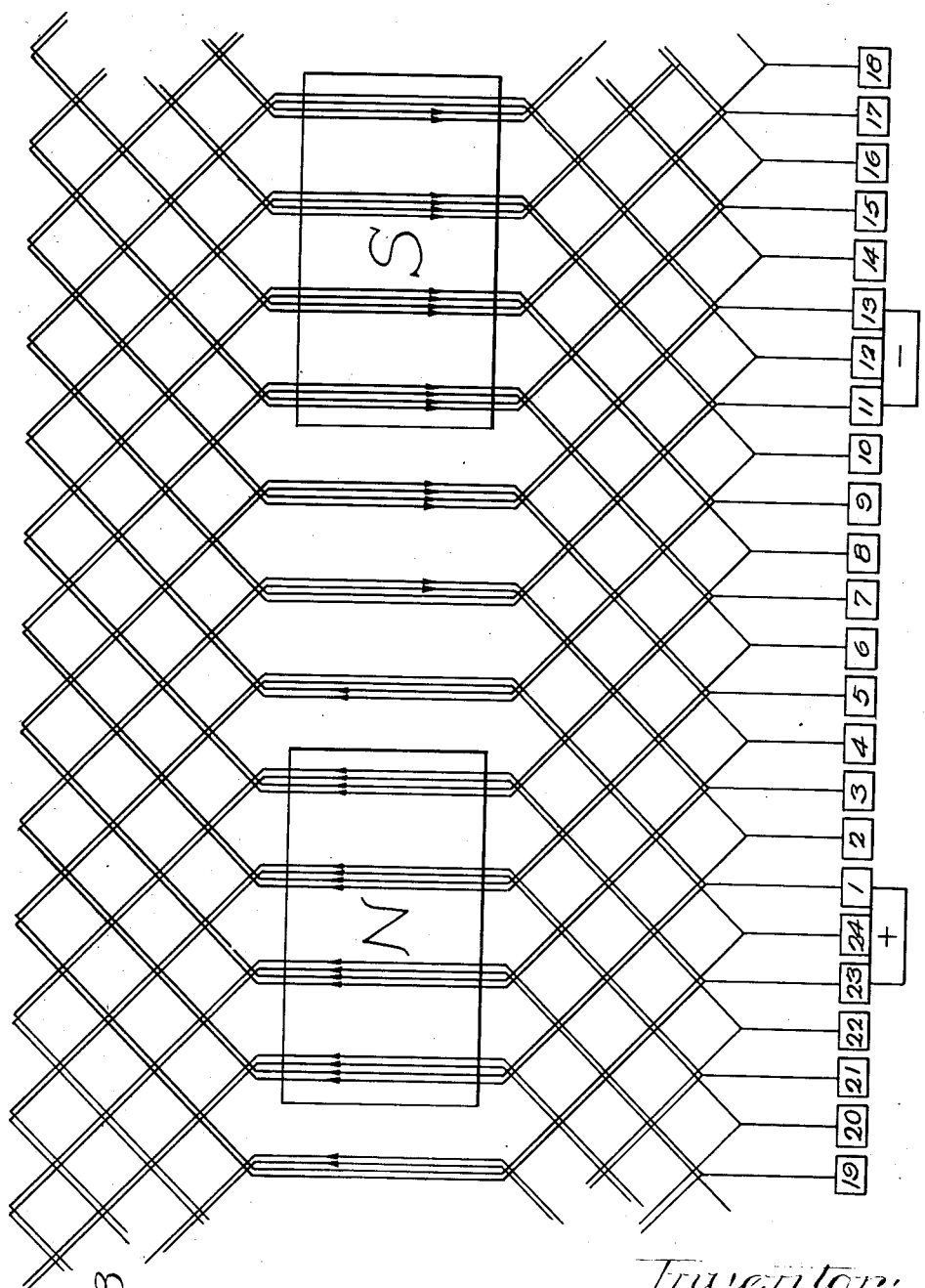
Fig. 3 shows a development of a lap winding similar to that of Fig. 2 except that the pitch of the winding is larger so that the advantages of the present invention are not obtained.

The desirable effect which is obtained by the winding arrangement illustrated in Figs. 1 and 2 will be more fully appreciated by a comparison with the lap winding illustrated in Fig. 3 in developed form. This winding comprises forty-eight conductors having their terminals connected to twenty-four commutator bars as in the construction above described and the motor is similarly provided with two poles but, in the construction of Fig. 3, the winding or slot pitch is taken as "1 and 6", that is, a conductor located in armature slot number 1 is connected to a return conductor located in armature slot number 6. In this case, the pitch is greater than three-fourths of the angular distance between the axes of the poles or more than 135 electrical degrees and it will be apparent from an examination of the winding, assuming that the brushes have the polarity indicated by the plus and minus signs, that the direction of flow of the currents in the several conductors of the armature winding is such that the desirable neutralizing effect, heretofore mentioned, is not obtained. In this instance, the currents flow in the same direction in all the conductors in each armature slot, this condition prevailing throughout the circumference of the armature. In some of the armature slots, in the region of commutation, there are some conductors in which no current flows but in none of the conductors is there any current tending to neutralize the effect of currents flowing in other conductors in the same slot.

In Figs. 4, 5, 6 and 7 of the drawings, the present invention is shown applied to a four pole motor having a wave wound armature. In this construction, the stator comprises a circular core or field frame E provided with pole pieces $p$, the polarity of which is indicated by the letters N and S. As shown in Figs. 6 and 7, the field frame is provided with windings which are mounted on the pole pieces and which are arranged to be connected in series with the armature, these windings being preferably of the skein form. These windings $w$ which are concentrated on the pole pieces $p$ are formed from skeins $k$, each skein being made up of a plurality of electric conductors which are sufficiently flexible to permit the skeins, shown as being partially applied to a section of the field frame in Fig. 6, to be wound around the pole pieces so that the resultant construction has the appearance illustrated in Fig. 7, the windings *w* being relatively loose on the pole pieces so that the reactance of the field windings is materially decreased as compared with the usual pre-formed tightly wound field winding. Although the loosely wound skein windings improve the operation of the universal motor, the pre-formed tightly wound windings may, if desired, be employed in combination with the improved armature winding herein described.

Figure 4:
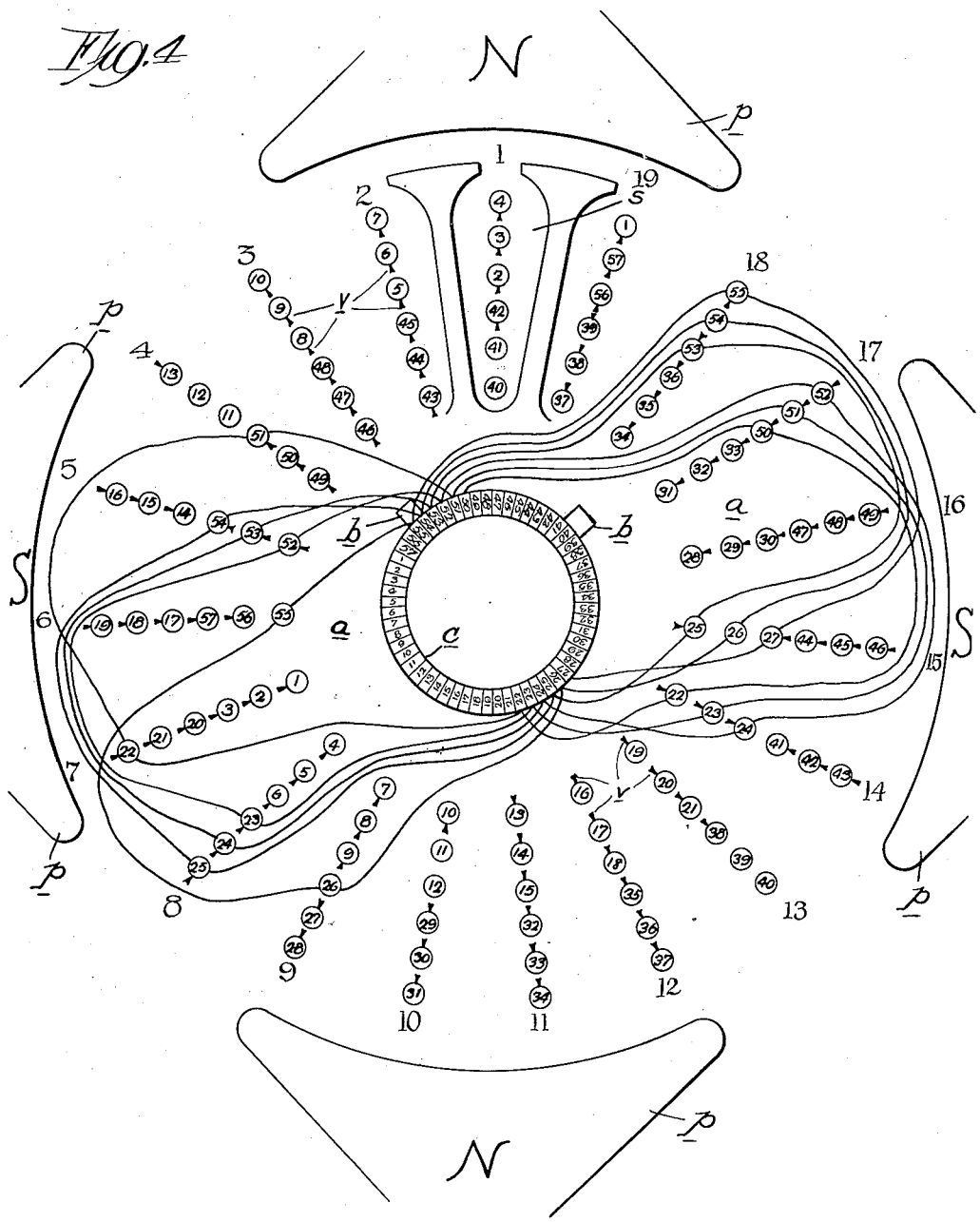
Fig. 4 shows a somewhat diagrammatic end elevation of a four pole electric motor provided with a series armature winding and embodying the features of the present invention.
Figure 5:
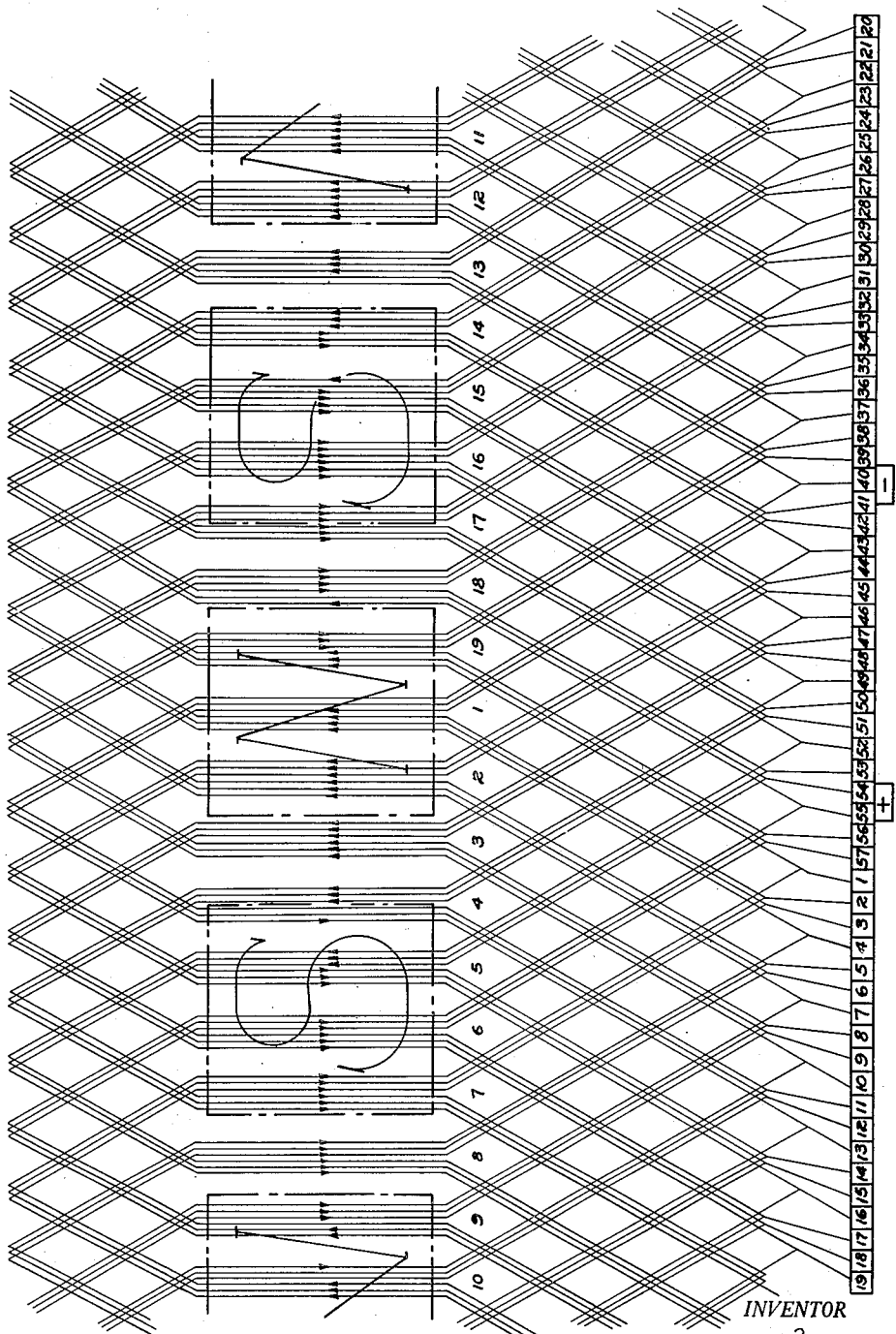
Fig. 5 shows a development of the armature winding of the construction illustrated in Fig. 4, showing the neutralizing effect of the armature current in the conductors located in certain armature slots.

The form of motor illustrated in Figs. 4, 5, 6 and 7 comprises an armature *a* having a magnetizable core formed with a plurality of slots *s*, preferably inclined longitudinally of the armature, and adapted to receive the conductors which form the armature winding. The magnetizable core of the armature together with the pole pieces and the field frame are formed preferably of laminated iron. In this instance, the armature winding is made up of one hundred and fourteen conductors forming fifty-seven armature turns, there being nineteen armature slots *s* each containing six conductors. The commutator *c* comprises fifty-seven commutator bars which are engaged by the two brushes *b* of opposite polarity, as indicated by the plus and minus signs. In this instance, the conductors of the armature winding have been numbered in two series of fifty-seven conductors each, one series of conductors including the three inner conductors in each armature slot while the other series includes the three outer conductors in each slot. The conductors which are connected to the same commutator bar are identified by the same number as that commutator bar. For example, conductor number 52 of the inner series, at the upper left-hand side of Fig. 4, is connected at the front of the armature to commutator bar number 52 and is connected at the back of the armature to conductor number 23 of the outer series which is located in the fourth slot from that in which the inner conductor number 52 is located, counting the last mentioned slot as number 1. In this case, the winding or slot pitch is selected as "1 and 4". The conductor number 23 is in turn connected at the front of the armature to commutator bar number 23 and this commutator bar is also connected to conductor number 23 of the inner series. Conductor number 23 of the inner series is connected at the back of the armature to conductor number 51 of the outer series located in the fourth armature slot therefrom and conductor number 51 of the outer series is connected at the front of the armature to commutator bar number 51, thus completing one circuit around the armature through two armature coils. In this case, the armature or slot pitch has been selected greater than one-half the angular distance between the axes of poles of opposite polarity, or more than 90 electrical degrees, but it is substantially less than 135 electrical degrees. Assuming the instantaneous polarity of the brushes *b* as indicated on the drawings, the currents in the armature conductors will flow at a given instant in the direction indicated by the arrows *v*. The direction of the arrow heads outwardly from the axis of the armature indicates the flow of current away from the reader, as viewed in Fig. 4, while the direction of the arrows inwardly toward the axis of the armature represents the flow of current toward the reader. The directions of flow of the current in the various conductors may be more clearly understood by an examination of Fig. 5 from which it will be seen that in those armature slots which are located in the region of commutation, the currents flowing in some of the conductors in each slot are opposed by the currents flowing in other conductors in the same slots, thus neutralizing the inductive effect and lowering the armature reaction. In other armature slots located between the points just mentioned, the currents flow in the same direction in all conductors located in the same slot. In the case of a wave winding, also, it will be found that if the armature pitch be taken greater than 135 electrical degrees, according to the practice heretofore employed, no neutralizing effect is obtained by the currents in all of the conductors in each armature slot flowing in the same direction, similar to the condition prevailing in the lap winding of large pitch illustrated in Fig. 3.

In a manner similar to that heretofore described, various other armature windings may be formed with pitches substantially equal to one-half the angular distance between the axes of poles of opposite polarity, or about 90 electrical degrees, and not more than substantially 135 electrical degrees, thereby producing a neutralizing effect in certain armature slots with the result that the reactance of the armature is materially reduced, thereby adapting the motor for more efficient operation on alternating current, without the necessity of shifting the brushes or adding compensating poles or the like to the construction of the motor. In the embodiments illustrated, the pitch is substantially equal to the chord subtended by the pole faces of one of the poles and this arrangement is preferably maintained in combination with the other advantageous features herein described. A motor of this type may be adapted for various uses where universal motors may be employed with advantage. For example, the improved motor is of particular advantage as a part of the permanent equipment of adding machines and the like, thus adapting these machines for use, without alteration, on either alternating current or direct current supply circuits.

It is to be understood that the structure shown is for purposes of illustration, and that variations may be made in it without departing from the spirit and scope of the invention as defined by the appended claims.

I claim:

1. A compensated motor for use with direct and alternating currents comprising a field frame having spaced pole pieces, a loose skein winding for said pole pieces, an armature having a commutator, and a single winding on the armature connected to the commutator and in series with said field winding, said armature winding having certain of its conductors in which current flows in one direction positioned adjacent others in which current flows in the opposite direction, said conductors being so connected to the commutator and positioned relative to the field poles as to cause them, together with said field winding, to automatically compensate the inductive effect of the armature when the motor is used with alternating current, said armature winding acting to reduce the flux generated by direct current, whereby the motor is automatically compensated to make its speed-torque characteristics with alternating current substantially equal to those with direct current.

2. A compensated motor for use with direct and alternating currents comprising a field frame having spaced pole pieces, a loose skein field winding for said pole pieces, a slotted armature having a commutator, a winding for said armature connected to said commutator and in series with said field winding, there being a plurality of conductors of said armature winding in each slot, said conductors being so connected with respect to the commutator and so located in the slots and with respect to the pole pieces that, together with said field winding, they automatically compensate the inductive effect of the armature when the motor is used with alternating current, said armature winding also acting to decrease the armature flux generated when the motor is used with direct current whereby the speed-torque characteristics of the motor on alternating and direct current are substantially equalized.

3. A universal, electric motor for use with both direct and alternating currents, comprising a field frame of the direct current type having salient spaced pole pieces with uninterrupted faces, a field winding on said pole pieces, an armature having a commutator, brushes positioned on said commutator, approximately in the neutral commutation zone, and a single winding on said armature connected to said commutator and connected in series with said field winding, the conductors of said armature winding being so connected to said commutator and so positioned on said armature relative to one another and relative to said pole pieces that the currents in certain adjacent conductors that are between the pole pieces and inactive in producing useful torque will flow in opposite directions so that they neutralize one another magnetically to thereby reduce the reactance of the armature with alternating current and decrease the flux generated by direct current to make the speed-torque characteristics of the motor substantially equal for both direct and alternating current.

THEODORE S. BINDSCHEDLER.